UNITED STATES PATENT OFFICE.

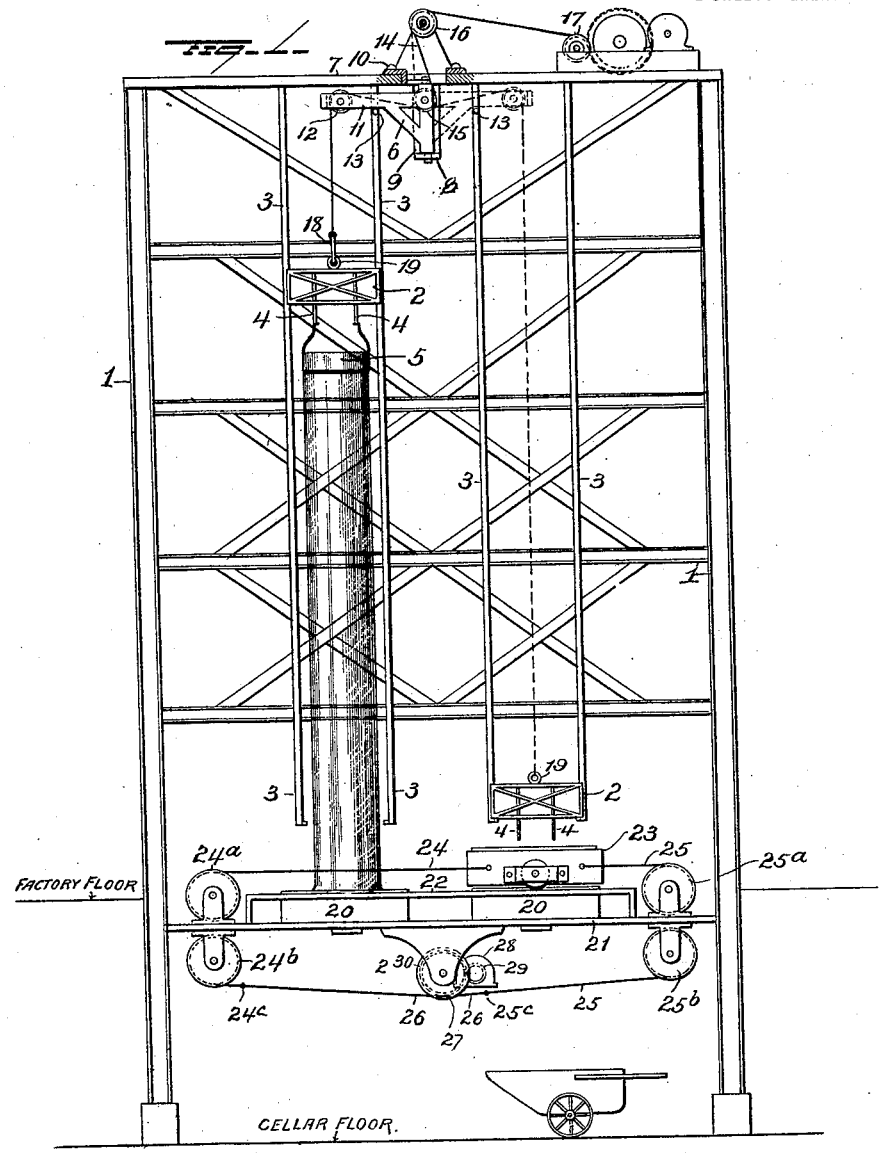

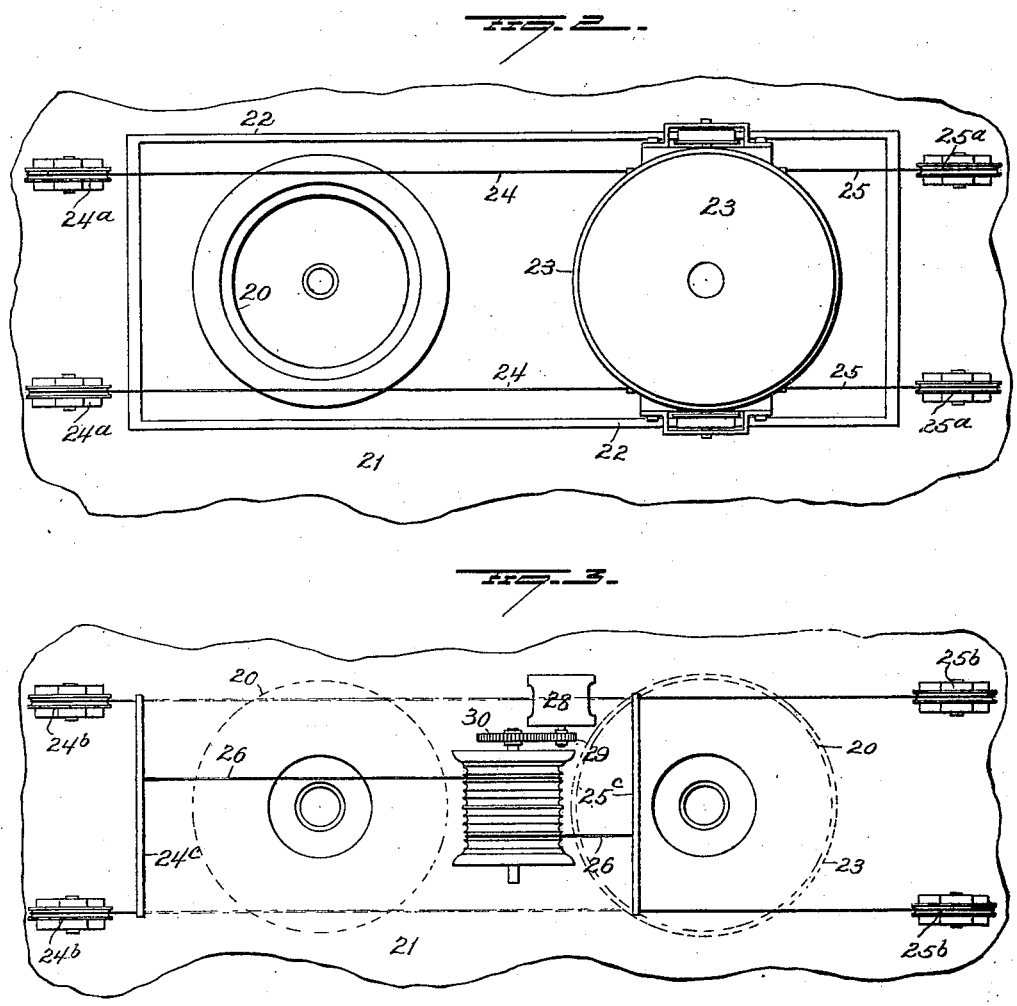

JAMES H. CAMPBELL, OF LANCASTER, OHIO, ASSIGNOR TO THE COLUMBUS GLASS COMPANY, OF LANCASTER, OHIO.

APPARATUS FOR DRAWING GLASS CYLINDERS.

1,335,653. Specification of Letters Patent. Patented Mar. 30, 1920.

Application filed March 10, 1919. Serial No. 281,678.

*To all whom it may concern:*

Be it known that I, JAMES H. CAMPBELL, a citizen of the United States, and a resident of Lancaster, in the county of Fairfield and State of Ohio, have invented certain new and useful Improvements in Apparatus for Drawing Glass Cylinders; and I do hereby declare the following to be a full, clear, and exact description of the invention, such as will enable others skilled in the art to which it appertains to make and use the same.

This invention relates to an improvement in apparatus for drawing glass cylinders.

Heretofore in drawing cylinders from pots, it has been the practice to make the pots double and reversible and provide each double pot with a drawing unit, including hoist motor and drum, or the pots have been mounted on a rotary turn table and moved in succession under the drawing apparatus. The first of these systems is expensive to install and maintain as an injury to or undue wear on one pot necessitates the abandonment of the entire pot structure. The turntable system with a plurality of pots thereon is not only expensive, but takes up a large amount of floor space and are difficult to keep in adjustment so as to present the glass in all the pots thereon properly to the bait.

The object of the invention is to greatly simplify the pot system of cylinder drawing, and it consists in providing a series of drawing units, each composed of two fixed but independent pots, a single movable heater for the two pots, a drawing apparatus for each pot and a single shiftable hoist for each unit.

The invention further consists in the parts and combination of parts and in the details of construction as will be more fully explained and pointed out in the claims.

In the accompanying drawings Figure 1 is a view in elevation of a single drawing unit embodying my invention; Fig. 2 is a plan view of the pots and the heater and cover for the latter, and Fig. 3 is a view in elevation of the mechanism for shifting the cover from one pot to the other.

1 represents the unit frame made of angle iron suitably supported at the lower end, and braced at points above the pots. Each unit has two drawing cages 2, each mounted on independent guides 3, and each cage is provided with brackets 4 for the attachment of the bait 5.

6 is a crane located adjacent to but below the top 7 of the frame 1, and midway between the adjacent guides 3 for the two cages 2. This crane is supported at its lower end on the foot 8 of bracket 9 secured to and depending from the top 7 of frame 1, and at its upper end in bearing 10 also secured to said top 7. This crane has an arm or jib 11 carrying a sheave 12 adapted to rest in a plane approximately over the center of either cage 2, and the crane is adapted to be turned so as to carry its jib over either cage, and be supported when in such position by the supports 13 secured to the adjacent guides 3, the said supports taking the major part of the weight off the end bearings of the crane. The sheave 12 is as above explained carried in the jib adjacent the free end of the latter. The hoist cable 14 passes over this sheave and under a sheave 15 in the post or body of the crane and from thence up and over a sheave 16 above the top 7 of frame 1, to the winding drum 17 which is actuated in the usual manner by an electric motor. This cable is provided at its free end with a hook 18, and each cage 2 is provided with a centrally located eye or loop 19 to be engaged by the hook 18 for lifting and lowering the cage. By swinging the crane first to one side and then the other the cages can be raised and lowered in succession to draw the glass cylinders.

The pots 20 are seated on the fixed platform 21 which may be in the horizontal plane of the floor of the factory, or above or below same as may be desired. There is a pot for each drawing apparatus and they are so located with relation to the latter that the baits 3 when lowered will be properly centered with relation to the pot.

Secured to the platform 21 is the trackway 22 located approximately in line with the top of the pots 20, the pots being between the rails of the trackway, and mounted to travel on the trackway is the pot cover and heater 23, of substantially the diameter of the pot, so as to completely cover the pot cavity when stationed over the pot. The cover 23 is provided with track wheels mounted to travel on the rails 22, and is also provided with one or more openings for the passage of burners employed for heating up the pots after each draw, the burners not being shown as they constitute no part of this invention.

The pot cover and heater 23 is attached to the two sets or pairs of cables 24—25, the cable of each pair being separated sufficiently so as not to project over the cavity of the pot from which the cylinder is being drawn. Cables 24 pass around sheaves 24ª and 24ᵇ at one end of platform 21, and are attached at their ends to the bar 24ᶜ, while cables 25 pass around sheaves 25ª and 25ᵇ at the opposite end of the platform and are secured to the bar 25ᶜ. The bars 24ᶜ and 25ᶜ are connected to the opposite ends of a cable 26 which is wound on drum 27, so that as the cable 26 winds up at one end, it unwinds at the other and thus operates to shift the combined cover and heater 23 from a position over one pot to the other pot. The drum may be actuated by the electric motor 28 and gearing 29 and 30 shown.

The pots 20 shown are of the type having central openings normally closed by hollow thimbles, through which the air for expanding and holding the cylinders in shape is introduced, and which thimbles are removed from around said central openings to permit the pots to be drained after each draw, the waste from the pot passing through openings in the platform 21 and into a barrow or other receptacle located in the cellar.

In the operation of a unit one of the pots is heated and when in condition, is filled with glass. A cage 2 with the bait 5 thereon is then lowered until the skirt or edge of the bait is in the glass. After the bait has remained in the glass for a sufficient time for the glass to adhere thereto, it is lifted by the hoist cable and the cylinder drawn in the well known manner, air of course being admitted to expand the cylinder if necessary, and to hold its shape during the drawing operation. While one cylinder is being drawn, the cover should be over the idle pot which is then subjected to intense heat to melt out the glass remaining from the previous draw and also to put the pot in condition to receive a fresh batch of glass which is ladled into it at the proper time. After the cylinder has been drawn, it is taken down and capped off and the bait after being cleaned, is ready for another draw. After the cage with the cylinder thereon has been lowered, as in taking down the cylinder, the hoist cable is detached therefrom and the crane shifted to carry the cable over the other cage 2 of the unit, and after attaching it to said cage, and a bait attached to the latter, the draw from the second pot is started.

With this improvement, while one pot is being drawn from, the other is being made ready to receive a fresh batch of glass, and with the shiftable hoist cable, one hoist mechanism serves two drawing devices and two pots, so that in each unit all parts except one cage may be in use all the time.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. In glass drawing apparatus, the combination of a plurality of pots, a bait carrying device for each pot, and a single hoist mechanism, the cable of which is adapted to be shifted from one bait carrying device to another, for raising and lowering the same.

2. In glass drawing apparatus, the combination of a plurality of fixed pots, a bait carrying device for each pot, independent guides for each bait carrier, and a single hoist mechanism the cable of which is adapted to be shifted from one bait carrier to the other for raising and lowering the same.

3. In glass drawing apparatus, the combination of two pots, a bait carrying device for each pot, a swinging arm located intermediate the two bait carrying devices and adapted to be positioned over either and a hoist cable carried by said arm and adapted to be connected with either bait carrying device.

4. In glass drawing apparatus, the combination of two pots, a bait carrying device for each pot, a swinging arm located intermediate the two bait carrying devices and adapted to be positioned over either, seats for supporting said arm in its two positions and a hoist cable carried by said arm and adapted to be connected with either bait carrying device.

5. In glass drawing apparatus, the combination of a plurality of fixed pots, a cover and heater adapted to be shifted from one pot to the other, a bait carrying device for each pot, and a single hoist mechanism the cable of which is adapted to be shifted from one bait carrying device to another for raising and lowering the same.

6. In glass drawing apparatus, the combination of a plurality of fixed pots, a cover and heater adapted to be shifted from one pot to the other, means for shifting the said cover, a bait carrying device for each pot and a single hoist mechanism the cable of which is adapted to be shifted from one bait carrying device to another for raising and lowering the same.

7. In glass drawing, the combination of a fixed support, a plurality of pots thereon, a trackway on said support, a combined cover and heater mounted on said trackway and adapted to be shifted from one pot to the other, cables connected with said cover for moving it back and forth, a drum for actuating the cables, means for actuating the drum, bait carrying mechanism and a single hoist mechanism adapted to be shifted from a position over one pot to a position over the other for raising and lowering the bait carrying mechanism.

In testimony whereof, I have signed this specification in the presence of two subscribing witnesses.

JAMES H. CAMPBELL.

Witnesses:
A. M. FLOWERS,
F. F. ERICK.